(12) United States Patent
Toyama

(10) Patent No.: US 6,469,837 B2
(45) Date of Patent: Oct. 22, 2002

(54) IMAGING OPTICAL APPARATUS

(75) Inventor: Minoru Toyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 116 days.

(21) Appl. No.: 09/755,181

(22) Filed: Jan. 8, 2001

(65) Prior Publication Data

US 2001/0015855 A1 Aug. 23, 2001

(30) Foreign Application Priority Data

Jan. 12, 2000 (JP) .................................. 2000-003638

(51) Int. Cl.[7] ............................. G02B 3/00; G02B 6/18; G02B 6/32
(52) U.S. Cl. .................. 359/652; 385/34; 385/119; 385/124
(58) Field of Search .................... 359/652, 653, 359/654; 385/34, 119, 124

(56) References Cited

U.S. PATENT DOCUMENTS 5,623,370 A * 4/1997 Ueda et al. .................. 359/654

* cited by examiner

*Primary Examiner*—Scott J. Sugarman
(74) *Attorney, Agent, or Firm*—Whitman, Curtis & Christofferson, PC

(57) ABSTRACT

An imaging optical apparatus comprising a gradient-index rod lens array and two transparent or light transmitting optical elements that are substantially identical in shape and imaging characteristics and which are provided in the object space and the image space in the optical path of said gradient-index rod lens array in such a way that they are symmetrical with respect to said gradient-index rod lens array.

3 Claims, 8 Drawing Sheets

IMAGING OPTICAL APPARATUS

BACKGROUND OF THE INVENTION

The present invention relates to an imaging optical apparatus that is typically used in an LED printer to allow the light from an LED array to form an image.

FIG. 8 shows the general layout of an LED printer which is generally indicated by 1A and which has the following components arranged around a photosensitive drum 10 in the clockwise direction indicated by the arrow: a charging device 12 for uniform charging of the entire surface of a photoreceptor coat 11 on the surface of the photosensitive drum 10; an LED array 13 for exposing the photoreceptor coat 11 to form an electrostatic latent image; a developing device 14 by which toner particles 14a are deposited on the electrostatic latent image to form a toner image; a transfer device 16 for transferring the toner image onto a recording sheet 15; a fixing device 17 for fixing the transferred toner image on the recording sheet 15; a cleaner 18 for removing the residual toner particles 14a on the photoreceptor coat 11; and an erase lamp 19 for removing any residual charges on the photoreceptor drum 11.

The LED array 13 consists of LED devices arranged in a two-dimensional pattern that extends along the photosensitive drum 11 in a direction parallel to the width of the recording sheet 15. In accordance with the characters, figures and other imagery to be printed, the LED devices are selectively fired to emit light L1. A rod lens array 20 is provided intermediate between the LED array 13 and the photosensitive drum 10; this consists of gradient-index rod lenses known as SELFOC lenses (the trade name of Nippon Sheet Glass Co., Ltd.) in the form of cylinders connected side to side. The rod lens array 20 condenses the light L1 into light L2 which forms an image on the photoreceptor coat 11. The image formed by the rod lens array 20 is a correct life-size image so that the image resulting from the firing of the LED devices in the LED array 13 is straightforwardly formed as the latent image.

The LED printer 1A has the problem of large overall size since not only the imaging optical apparatus consisting of the LED array 13 and the rod lens array 20 but also other image forming elements including the charging device 12 are all arranged outside the photosensitive drum 10. In order to reduce the printer size, it has been proposed that the LED array 13 and the rod lens array 20 be placed within the photosensitive drum 10 to reduce the printer size as shown in FIG. 9. In the resulting LED printer generally indicated 1B, the photosensitive drum 10 comprises a cylinder 21 that is made of a transparent or light transmissible material such as glass and which has a photoreceptor coat 11 formed on the surface. The LED array 13 emits light L1 which is condensed by the rod lens array 20 into light L2 which in turn passes through the transparent or light transmitting cylinder 21 to form an image on the photoreceptor coat 11. The image forming elements of the LED printer 1B other than the LED array 13 and the rod lens array 20, as exemplified by the charging device 12, are identical to those shown in FIG. 8 and omitted from FIG. 9.

In addition to its smaller size, the LED printer 1B has the advantage of being free from the fouling of the LED array 13 and the rod lens array 20 due to the scattering of toner particles 14a (see FIG. 8).

Nevertheless, the LED printer 1B shown in FIG. 9 has one serious problem: the thicker portion of the transparent or light transmitting cylinder 21 has a circular cross section, so when the light L1 condensed by the rod lens array 20 passes through this cylinder, it is refracted by the cylinder as if it were a concave lens. As a result, the light L2 does not form a precisely focused image and the resolution of the latent image is reduced to produce prints having only deteriorated image quality. For further details, see below.

The resolving power of a rod lens array is evaluated in terms of MTF (modulation transfer function) defined by the following equation:

MTF (%)={$(i_{max}-i_{min})/(i_{max}+i_{min})$}×100 where $i_{max}$ and $i_{min}$ are a maximum and a minimum, respectively, of the light intensity on the image plane for the case where bands of light are launched into the rod lens array. The MTF as defined above is usually determined for two directions, one for the length of the rod lens array and called transverse resolution MTFx and the other for its thickness and called longitudinal resolution MTFy. The resolving power of the rod lens array is evaluated in terms of the two MTF values.

The present inventors designed a gradient-index rod lens array having the following specifications (see FIG. 10): $n_0$=1.627; g=0.5348; $h_4$=0.75; $h_6$=−1.209; $h_8$=1.451 ($n_0$ is the refractive index at the center of each lens, and g, $h_4$, $h_6$ and $h_8$ are index gradient coefficients); angular aperture (α)=20°; lens length (T)=6.89 mm; and conjugate length (C)=15.1 mm. A plurality of such lenses were combined in an array and the measurement of their MTFx and MTFy was simulated with end points A and B being assumed to present a light source and an image forming area, respectively, and the results are shown in FIG. 11. Obviously, MTFx and MTFy assume maxima at an optimum focal position (focus=0), demonstrating the high resolving power of the rod lens array.

The present inventors then modified this optical system as shown in FIG. 12 by providing a cylindrical lens 40 in the image forming area B, with its longitudinal direction being in alignment with that of the rod lens array 20 and with its concave side facing the latter. The cylindrical lens 40 was assumed to have a refractive index comparable to that of BK7 glass and adapted to have a radius of curvature (R) of 15 mm on the outer circumference, a radius of curvature (r) of 13 mm on the inner circumference, and a thickness (t) of 2 mm. The MTFx and MTFy of this cylindrical lens were also measured by simulation and the results are shown in FIG. 13. Compared to the case where the cylindrical lens 40 was absent (FIG. 11), MTFx presents a similar profile but a maximum of MTFy is way off the optimum focal position, creating a difference greater than 100 μm between the optimum focal positions of MTFx and MTFy.

Most probably, this happened because the light issued from the rod lens array 20 refracted when passing through the cylindrical lens 40 and focused in an untoward point. Since the cylindrical lens 40 corresponds to the transparent or light transmitting cylinder 21 in the LED printer 1B shown in FIG. 9, a similar difference between MTFx and MTFy occurs in an actual LED printer having an imaging optical apparatus within a photosensitive drum and the latent image formed on the photoreceptor coat 11 decreases to cause eventual deterioration in the quality of printed characters and figures.

The image deterioration problem of defocusing is not limited to the LED printer but can occur in all situations where an imaging optical apparatus using a rod lens array has various transparent or light transmitting optical elements inserted into the optical path between the rod lens array and the image forming area.

SUMMARY OF THE INVENTION

The present invention is based on the review of the problems described above and its objective is to suppress the problem of reduced image resolution often encountered in imaging optical apparatus having a rod lens array with transparent or light transmitting optical elements inserted into the optical path between the rod lens array and the image forming area, as exemplified by a compact LED printer in which an imaging optical apparatus comprising an LED array and a rod lens array is placed within a photosensitive drum.

The stated object of the invention can be attained by an imaging optical apparatus comprising a gradient-index rod lens array and two transparent or light transmitting optical elements that are substantially identical in shape and imaging characteristics and which are provided in the object space and the image space in the optical path of said gradient-index rod lens array in such a way that they are symmetrical with respect to said gradient-index rod lens array.

The same object can also be attained by an imaging optical apparatus that is provided within a photosensitive drum having a photoreceptor coat formed on the outer circumference of a transparent or light transmitting cylinder and which condenses the light from an LED array with a gradient-index rod lens array and allows it to pass through the transparent or light transmitting cylinder to form an image on the photoreceptor coat, wherein a cylindrical lens that is made of substantially the same material as the transparent or light transmitting cylinder and which has substantially the same cross-sectional shape as the light transmissive portion of the transparent or light transmitting cylinder is provided such that said cylindrical lens and the light transmissive portion of the transparent or light transmitting cylinder are symmetrical with respect to the gradient-index rod lens array.

The present disclosure relates to the subject matter contained in Japanese patent application No. 2000-3638 (filed on Jan. 12, 2000), which is expressly incorporated herein by reference in its entirety.

DESCRIPTION OF THE PREFERRED EMBODIMENT

The imaging optical apparatus of the invention is now described in greater detail with reference to accompanying drawings.

Figure 1:
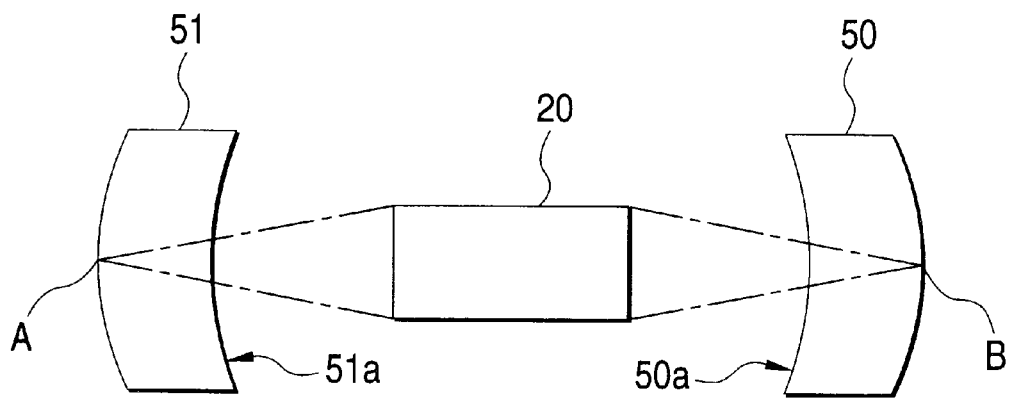
FIG. 1 shows in section the essential parts of an imaging optical apparatus according to an embodiment of the invention.

FIG. 1 shows in section the essential parts of the imaging optical apparatus according to an embodiment of the invention. As shown, two transparent or light transmitting optical elements that are substantially identical in shape and imaging characteristics, for example, two cylindrical lenses 50 and 51, each being concave on one side and convex on the other side, have their respective concave sides 50a and 51a face each other and are provided in the light source zone A and the image forming zone B in such a way that the distance between the concave side 51a and the entrance end face of a rod lens array 20 is equal to the distance between the concave side 50a and the exit end face of the same lens array 20. In other words, the two cylindrical lenses 50 and 51 are symmetrical with respect to the rod lens array 20.

Figure 2:
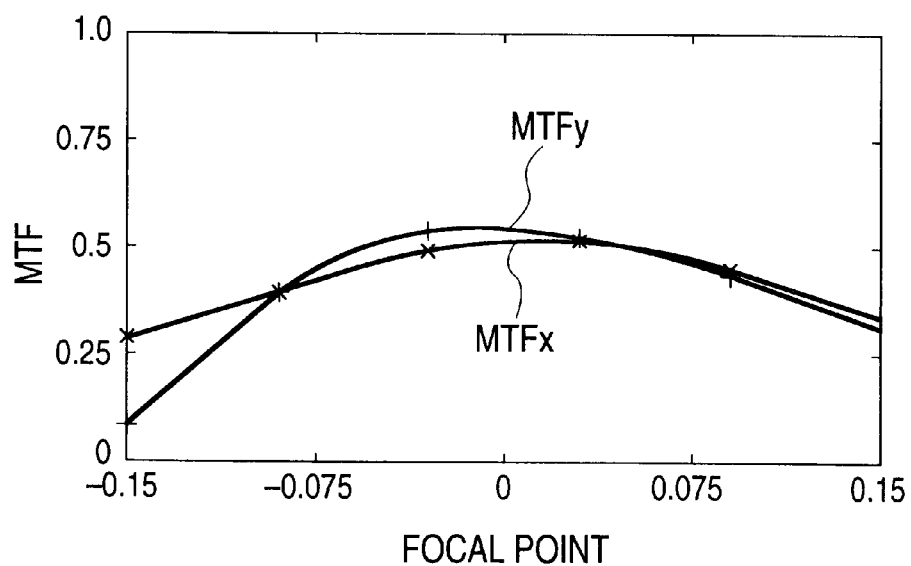
FIG. 2 is a graph showing the results of simulated measurements of MTFx and MTFy made to verify the action of the imaging optical apparatus shown in FIG. 1.
Figure 12:
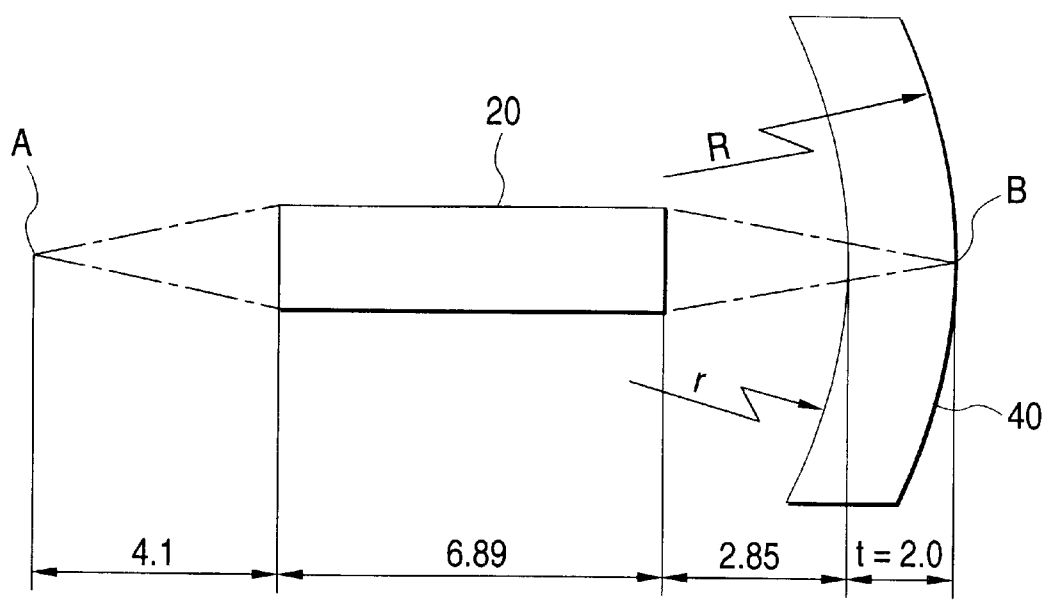
FIG. 12 shows the optical system used to measure the MTF of an imaging optical apparatus on the assumption that it is used in the LED printer shown in FIG. 9.
Figure 13:
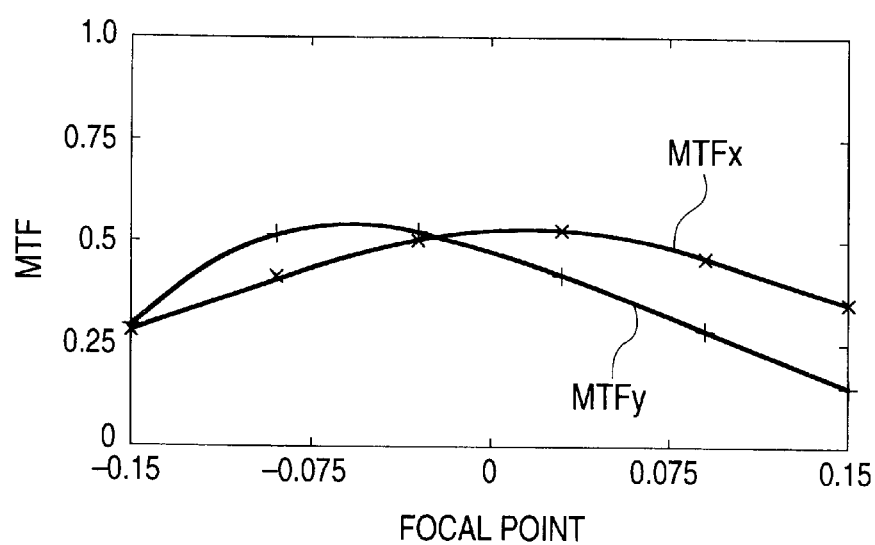
FIG. 13 is a graph showing the relationship between MTFx and MTFy measured by simulation with the optical system shown in FIG. 10.

FIG. 2 is a graph showing the results of simulated measurements of MTFx and MTFy of an optical system having two identical (BK7-made) cylindrical lenses arranged symmetrical with respect to the rod lens array according to the concept of the invention. Compared to the relationship shown in FIG. 13 between MTFx and MTFy of the optical system shown in FIG. 12 which had the cylindrical lens 40 provided only in the image forming zone B, the MTFx and MTFy of the tested optical system were in substantial agreement in terms of the optimum focal position and this fact shows that the imaging optical apparatus of the invention is capable of suppressing the deterioration of image quality. Most probably, the refraction of light by the cylindrical lens 50 in the image forming zone B was cancelled by the refraction by the cylindrical lens 51 in the light source zone.

The transparent or light transmitting elements to be used in the invention are not limited to the cylindrical lenses having a concave and a convex surface and they may be cylindrical lenses that are convex on both sides or cylindrical lenses that are plane on one side and convex on the other (see FIG. 7). In these alternative cases, a pair of cylindrical lenses of identical shape should also be provided symmetrical with respect to the rod lens array, with a side of one cylindrical lens facing a side in similar shape of the other cylindrical lens.

Figure 3:
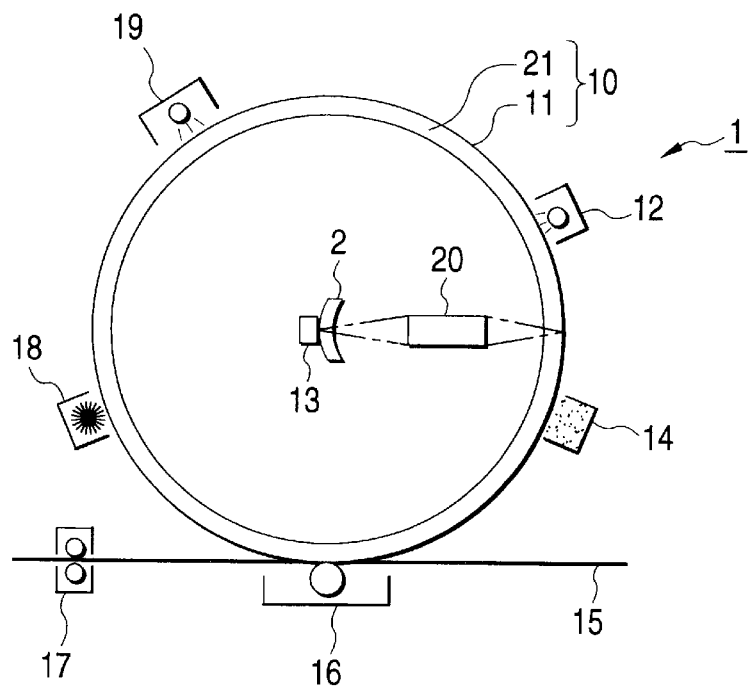
FIG. 3 shows in section the general layout of an LED printer equipped with the imaging optical apparatus shown in FIG. 1.
Figure 9:
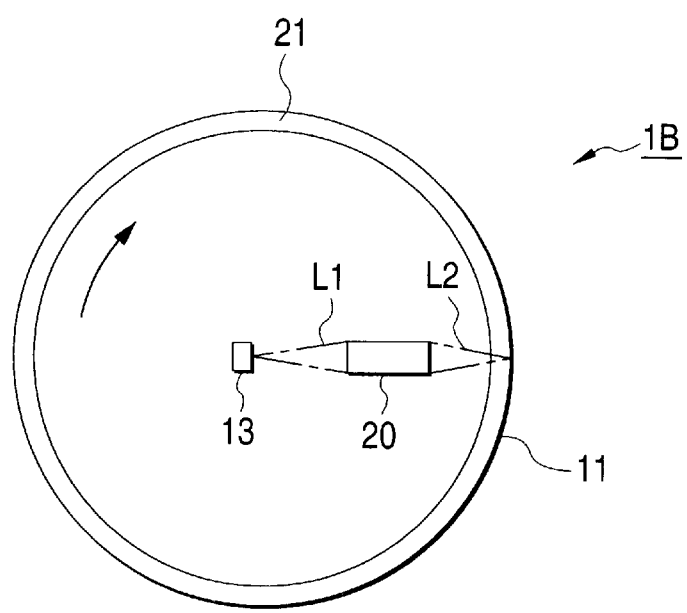
FIG. 9 shows in section the layout of another prior art LED printer.
Figure 10:
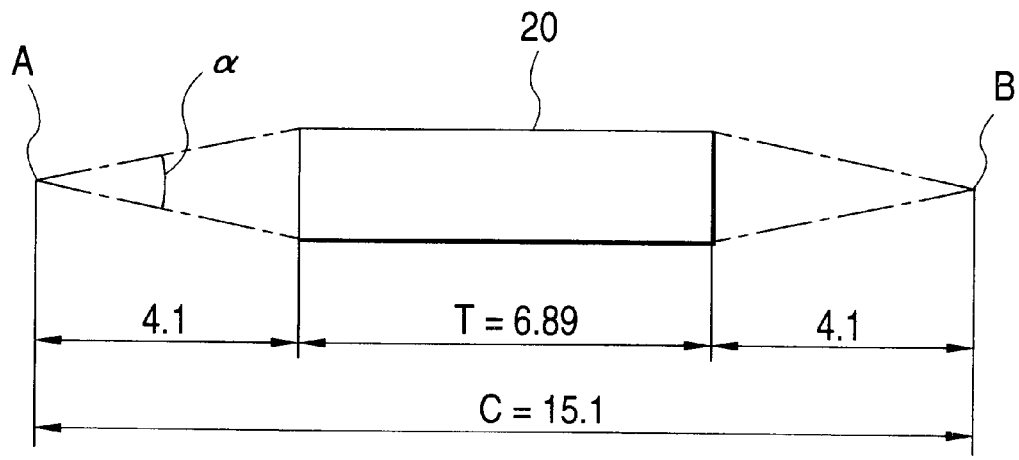
FIG. 10 shows the optical system used to measure the MTF of an imaging optical apparatus on the assumption that it is used in the LED printer shown in FIG. 8.
Figure 11:
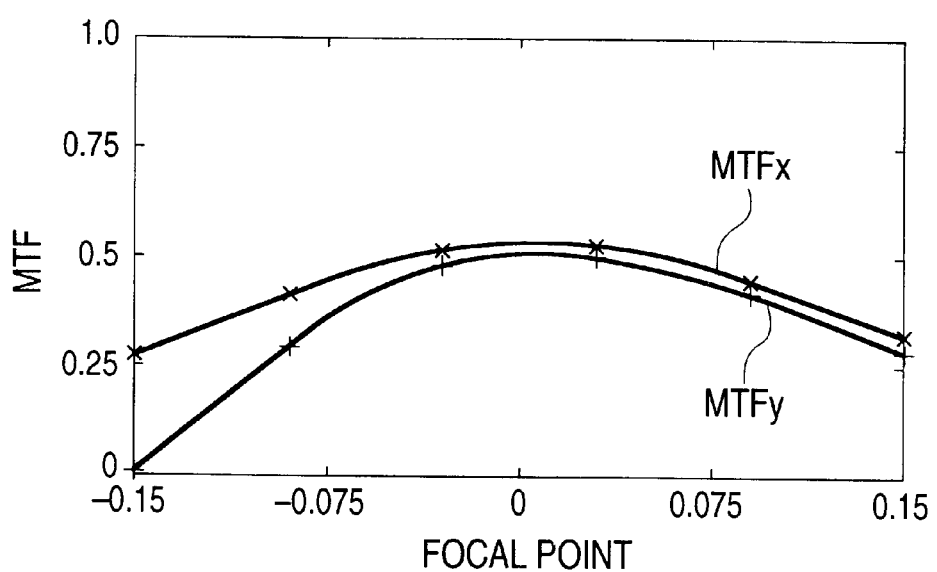
FIG. 11 is a graph showing the relationship between MTFx and MTFy measured by simulation with the optical system shown in FIG. 10.

One of the principal uses of the imaging optical apparatus of the invention having the structure described above is an LED printer having the structure shown in FIG. 9, more specifically in FIG. 3. An imaging optical apparatus having a cylindrical lens 2 is placed within a photosensitive drum 10 and has the following components arranged around the photosensitive drum 10 in the clockwise direction indicated by the arrow in FIG. 9: a charging device 12, a developing device 14, a transfer device 16, a fixing device 17, a cleaner 18 and an erase lamp 19.

Figure 4:
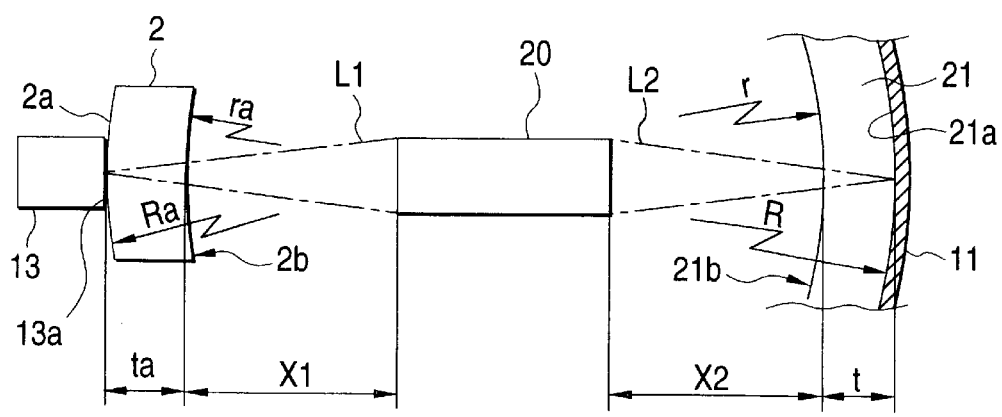
FIG. 4 shows in section the essential parts of the imaging optical apparatus in the LED printer of FIG. 3.

FIG. 4 shows the principal components of the imaging optical system. The cylindrical lens 2 is made of the same material as a transparent or light transmitting cylinder 21 of which the photosensitive drum is formed and it is identical in cross-sectional shape to the light transmissive portion of the cylinder 21. In the exemplary case shown in FIG. 4, the cylindrical lens 2 has thickness ta which is equal to the thickness t of the transparent or light transmitting cylinder 21 and it is convex on one side and concave on the other; the radius of curvature Ra of the convex face 2a is equal to the radius of curvature R of the outer circumference 21a of the transparent or light transmitting cylinder 21 and the radius of curvature ra of the concave face 2b is equal to the radius of curvature r of the inner circumference 21b of the transparent or light transmitting cylinder 21. Therefore, the cylindrical lens 2 has the same refraction characteristics as the transparent or light transmitting cylinder 21.

The cylindrical lens 2 and the transparent or light transmitting cylinder 21 are arranged on the optical axis to be symmetrical with respect to the rod lens array 20; in other words, the convex face 2a of the cylindrical lens 2 is opposed to the exit face 13a of the LED array 13 whereas the concave face 2b of the cylindrical lens 2 is opposed to the entrance end face of the rod lens array 20, and the distance X1 from the concave face 2b to the entrance end face of the rod lens array 20 is equal to the distance X2 from the exit end face of the rod lens array 20 to the inner circumference 21b of the transparent or light transmitting cylinder 21. Considering the conjugate length of the rod lens array 20, the cylindrical lens 2 is desirably oriented in such a way that its convex face 2a is in close proximity to the exit face 13a of the LED array 13.

In the LED printer having the structure described above, the light L1 issued from the LED array 13 is first subjected to a predetermined refractive action by the cylindrical lens 2 and then condensed by the rod lens array 20 into light L2 which forms an image on the photoreceptor coat 11. As mentioned earlier in this specification, the light L2 which is yet to reach the photoreceptor coat 11 is subjected to the refractive action of the transparent or light transmitting cylinder 21 and the resulting offset in optimum focal position is particularly great as regards MTFy. In the imaging optical apparatus of the invention, the cylindrical lens 2 and the transparent or light transmitting cylinder 21 which have identical refraction characteristics are arranged symmetrical with respect to the rod lens array 20, i.e., their concave faces are opposed to each other and equidistant from the rod lens array 20. With this arrangement, the refraction of light L2 by the transparent or light transmitting cylinder 21 is effectively cancelled by the refraction by the cylindrical lens 2 to reduce the offset in the optimum focal position of MTFy. As a result, a latent image without quality deterioration is formed on the photoreceptor coat 11 and sharp characters and figures having high resolution are printed on the recording sheet 15.

EXAMPLE

The following example is provided for the purpose of further illustrating the present invention but is in no way to be taken as limiting.

Figure 5A:
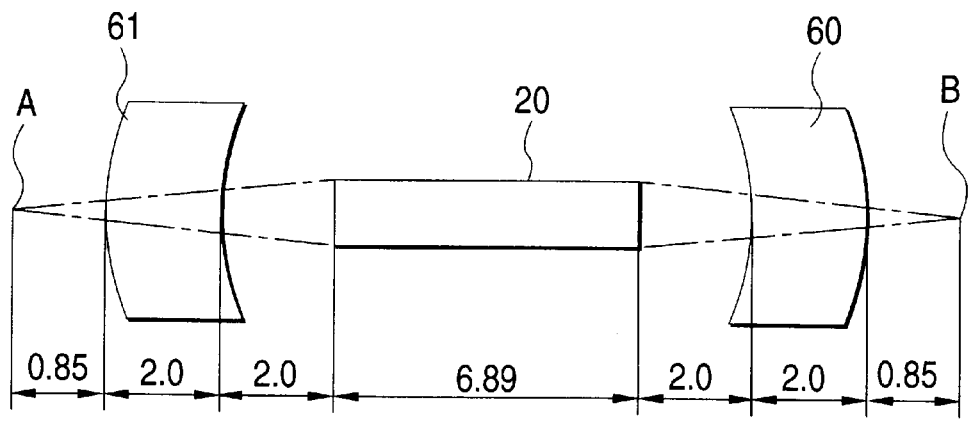
FIGS. 5A and 5B show one of the two optical systems used in the Example of the invention.
Figure 5B:
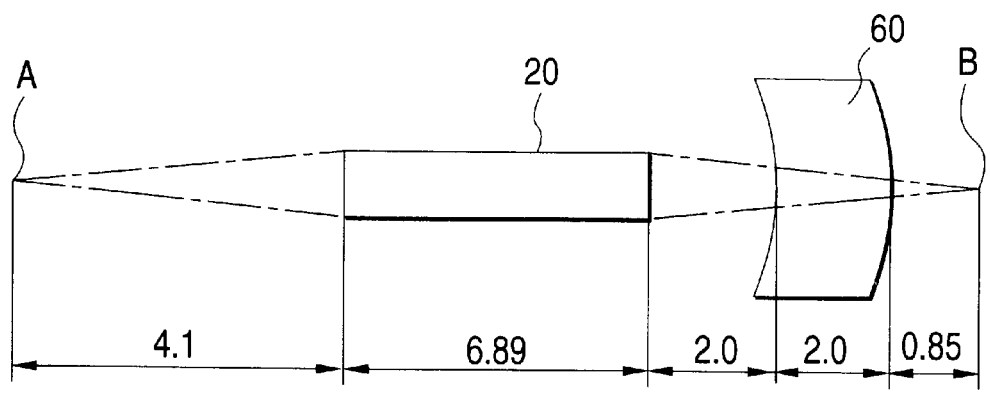

An optical system was constructed with a pair of BK7 cylindrical lenses 60 and 61 each having a thickness of 2 mm and being convex on one side and concave on the other; those lenses were arranged symmetrical with respect to a rod lens array 20 such that they were equidistant from it, with their concave sides facing each other as shown in FIG. 5A. Another optical system was constructed with the cylindrical lens 60 positioned only in the image forming zone B in the optical path of the rod lens array 20 as shown in FIG. 5B. For each of the two optical systems, MTFx and MTFy were measured and the difference between positions where their maxima occurred was determined. The numerals in FIGS. 5A and 5B refer to the distances in millimeters between optical elements.

Figure 6:
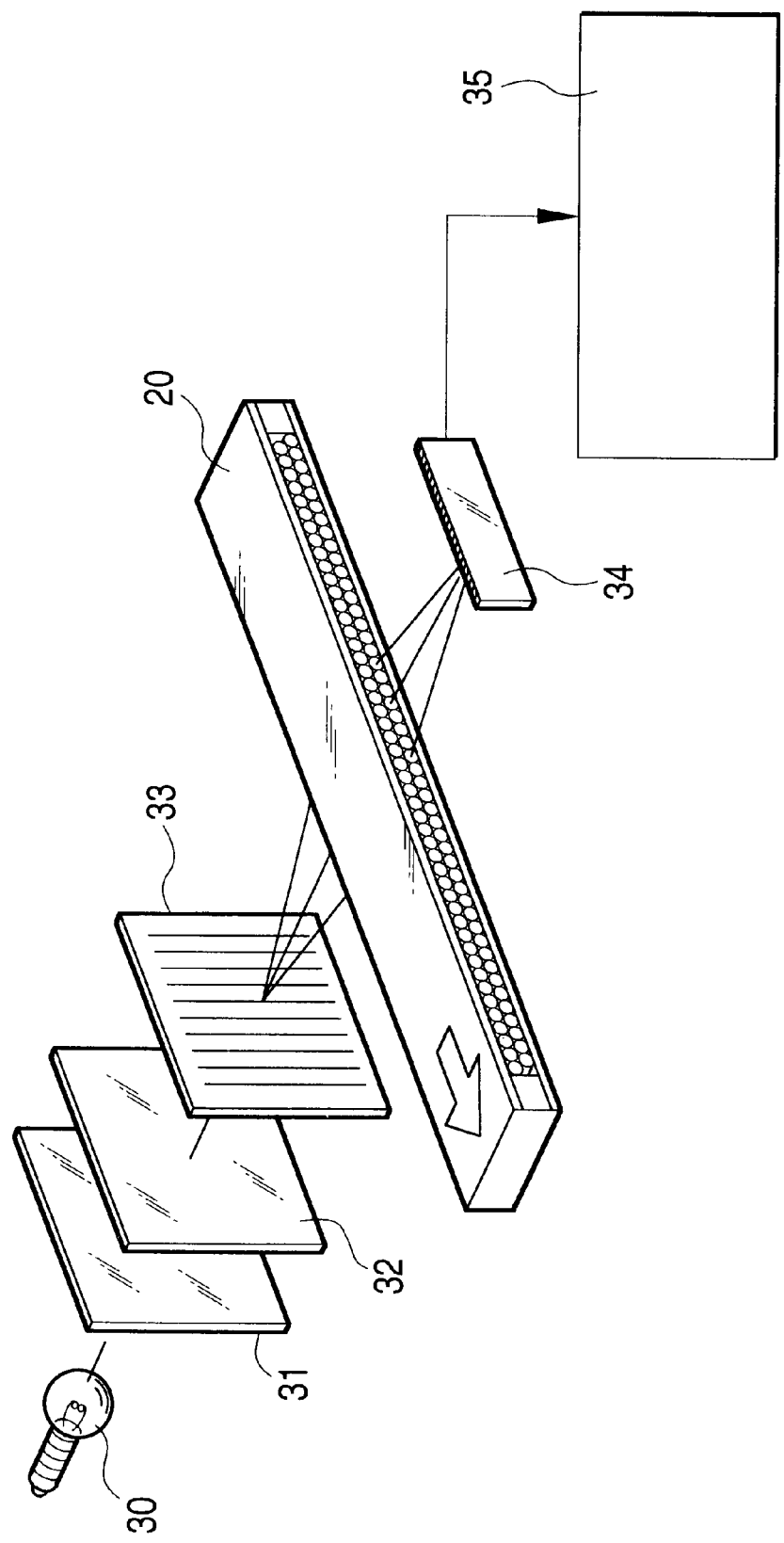
FIG. 6 shows the layout of an apparatus for MTF measurements.

MTFx and MTFy measurements can be made using an apparatus of the type shown in FIG. 6. Light from a halogen lamp 30 is passed through a filter 31 having a pass wavelength of 570 nm, a diffuser plate 32 and a rectangular wave test chart 33 to produce a rectangular wave grating pattern [usually about 10 lines per millimeter (1 p/mm)], which is launched into a rod lens array 20. The rod lens array 20 is moving in the direction indicated by the arrow which is perpendicular to the grating pattern and the images formed by the light from the rod lens array 20 are successively read with a CCD image sensor 34. The output signals from the CCD image sensor 34 are sent to a data processor 35 which calculates the MTF of the rod lens array 20 by the equation already set forth in the specification.

Figure 7A:
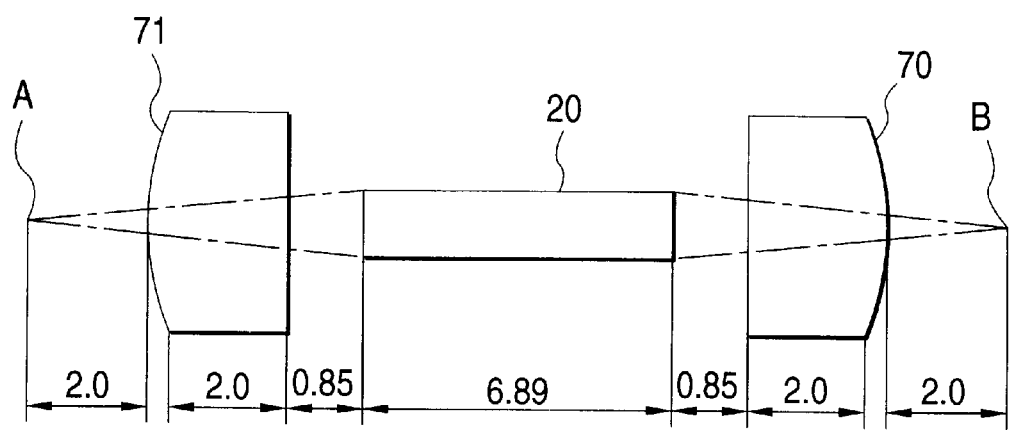
FIGS. 7A and 7B show the other optical system used in the Example of the invention.
Figure 7B:
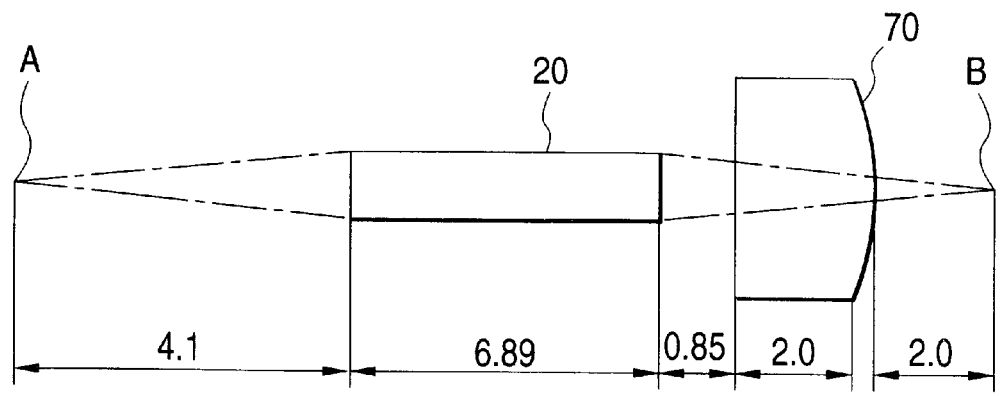
Figure 8:
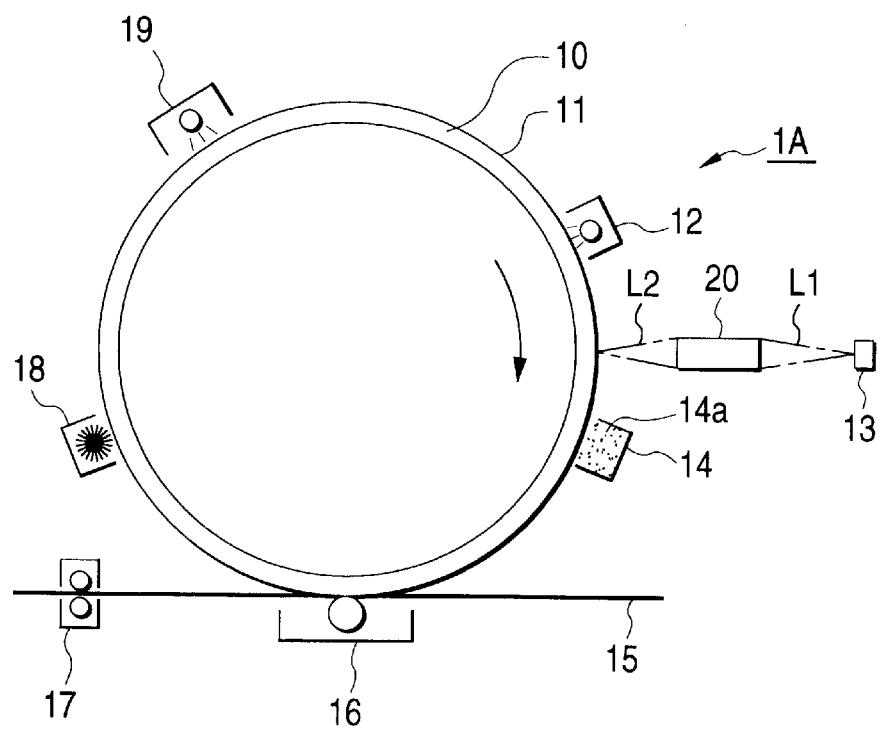
FIG. 8 shows in section the layout of a prior art LED printer.

Another optical system was constructed with a pair of BK7 cylindrical lenses 70 and 71 each having a thickness of 2 mm and being convex on one side and plane on the other; those lenses were arranged symmetrical with respect to a rod lens array 20 such that they were equidistant from it, with their plane sides facing each other as shown in FIG. 7A. Yet another optical system was constructed with the cylindrical lens 70 positioned only in the image forming zone B in the optical path of the rod lens array 20 as shown in FIG. 7B. For each of these two optical systems, MTFx and MTFy were measured with the apparatus shown in FIG. 6 and the difference between positions where their maxima occurred was determined. The numerals in FIGS. 7A and 7B refer to the distances in millimeters between optical elements.

The results are shown in Table 1. With both types of cylindrical lenses, symmetrical arrangement with respect to the rod lens array reduced the difference between positions where MTFx and MTFy showed maximum values, thus proving effective in the formation of high-quality images.

TABLE 1

| Pattern | Cylindrical lens (concavo-convex) | | Cylindrical lens (plano-convex) | |
| --- | --- | --- | --- | --- |
| period [lp/mm] | placed on one side | placed on both sides | placed on one side | placed on both sides |
| 8 | 180 μm | 60 μm | 80 μm | 40 μm |
| 12 | 180 μm | 40 μm | 100 μm | 40 μm |

As described on the foregoing pages, the present invention can suppress the problem of reduced image resolution often encountered in imaging optical apparatus having a rod lens array, with transparent or light transmitting optical elements inserted into the optical path between the rod lens array and the image forming area. If the invention is applied to a compact LED printer in which the imaging optical apparatus is placed within a photosensitive drum, deterioration of a latent image is suppressed to produce sharp printed imagery.

What is claimed is:

1. An imaging optical apparatus comprising a gradient-index rod lens array and two optical elements that are substantially identical in shape and imaging characteristics and which are provided in the object space and the image space in the optical path of said gradient-index rod lens array in such a way that they are symmetrical with respect to said gradient-index rod lens array.

2. The imaging optical apparatus according to claim 1, wherein said optical elements are cylindrical lenses.

3. An imaging optical apparatus that is provided within a photosensitive drum having a photoreceptor coat formed on the outer circumference of a light transmissible cylinder and which condenses the light from an LED array with a gradient-index rod lens array and allows it to pass through the light transmissible cylinder to form an image on the photoreceptor coat, wherein a cylindrical lens that is made of substantially the same material as the light transmissible cylinder and which has substantially the same cross-sectional shape as the light transmissible portion of the light transmissible cylinder is provided such that said cylindrical lens and the light transmissible portion of the light transmissible cylinder are symmetrical with respect to the gradient-index rod lens array.

* * * * *